United States Patent [19]

Nakamura et al.

[11] Patent Number: 5,420,648
[45] Date of Patent: May 30, 1995

[54] 2-CRT TYPE PROJECTION APPARATUS INCLUDING A RED/GREEN CRT AND A BLUE/GREEN CRT WITH DIFFERENT GREEN PHOSPHORS

[75] Inventors: Koji Nakamura; Hiroshi Okuda, both of Nagaokakyo, Japan

[73] Assignee: Mitsubishi Denki Kabushiki Kaisha, Tokyo, Japan

[21] Appl. No.: 935,178

[22] Filed: Aug. 26, 1992

[30] Foreign Application Priority Data

Oct. 18, 1991 [JP] Japan .................... 3-270914

[51] Int. Cl.6 ........................................... H04N 9/31
[52] U.S. Cl. ............................... 348/780; 348/776
[58] Field of Search ............... 358/60, 64, 72, 231, 358/65, 66; H04N 5/74, 9/31; 348/744, 805, 810, 808, 816, 776, 777, 778, 779, 780, 781, 782, 783, 784, 785, 786

[56] References Cited

U.S. PATENT DOCUMENTS

| | | | |
|---|---|---|---|
| 4,300,157 | 11/1981 | Midland | 358/242 |
| 4,410,841 | 10/1983 | Dusard et al. | 358/161 |
| 5,196,761 | 3/1993 | Majima et al. | 358/245 |

FOREIGN PATENT DOCUMENTS

| | | | |
|---|---|---|---|
| 0156425 | 10/1979 | Japan | 358/60 |
| 251393 | 11/1986 | Japan | H04N 9/31 |
| 252787 | 11/1986 | Japan | H04N 9/31 |
| 0217788 | 9/1987 | Japan | H04N 9/31 |
| 3-331847 | 12/1991 | Japan. | |
| 783746 | 8/1957 | United Kingdom | 358/66 |

*Primary Examiner*—James J. Groody
*Assistant Examiner*—Chris Grant

[57] ABSTRACT

A 2-CRT type projection apparatus having a green and blue two-color cathode ray tube and a green and red two-color cathode ray tube and producing a projected picture of high resolution and brightness. The green phosphor of one of the two-color cathode ray tubes is a phosphor which emits green light of high brightness and the green phosphor of the other cathode ray tube is a phosphor which emits green light extending a color reproduction range. Further, stripe directions of the two-color cathode ray tubes are substantially perpendicular to each other.

33 Claims, 12 Drawing Sheets

4 CRT - 2 LENS

4 CRT - 4 LENS

6 CRT - 6 LENS

2-CRT TYPE PROJECTION APPARATUS INCLUDING A RED/GREEN CRT AND A BLUE/GREEN CRT WITH DIFFERENT GREEN PHOSPHORS

BACKGROUND OF THE INVENTION

Field of the Invention

This invention relates to a 2-CRT type projection apparatus in which two cathode ray tubes (hereinafter, abbreviated as "CRTs") are used.

Description of the Related Art

FIG. 1 illustrates the configuration of a conventional projection apparatus which is of the so-called 3-CRT-1-lens type. In the FIGS. 1, 2 and 3 respectively designate red (R), green (G) and blue (B) monochromatic CRTs which are separated by 90°. The red CRT 1 faces to the blue CRT 3, and between them disposed are a dichroic mirror 4 which reflects red light only and a dichroic mirror 5 which reflects blue light only. The dichroic mirrors 4 and 5 cross with each other at right angles. A projection lens 6 and screen 7 are arranged in this sequence so that the dichroic mirrors 4 and 5 are sandwiched between the projection lens 6 and the green CRT 2. In the projection apparatus, red and blue pictures projected from the red and blue CRTs 1 and 3 are made overlapped with a green picture projected from the green CRT 2 by the dichroic mirrors 4 and 5, and these pictures are magnified by the projection lens 6 so as to form a color image on the screen 7. Since the three monochromatic CRTs are arranged so as to be separated by 90°, the projection apparatus is bulky in system configuration.

FIG. 2 illustrates the configuration of another conventional projection apparatus which is of the so-called 2-CRT-1-lens type. In the figure, 2 and 8 respectively designate green and blue/red CRTs which are separated by 180°. The blue/red CRT 8 has a phosphor screen consisting of blue and red phosphors which are arranged in a stripe form or a dot-matrix form. Between the green CRT 2 and the blue/red CRT 8 which are opposite to each other, disposed are a dichroic mirror 9 which reflects green light only and a dichroic mirror 10 which reflects blue light and red light only. The dichroic mirrors 9 and 10 cross with each other at right angles. The 2-CRT-1-lens type projection apparatus can be constructed in a smaller size than the projection apparatus of the 3-CRT-1-lens type shown in FIG. 1.

FIG. 3 illustrates the configuration of a further conventional projection apparatus which is of the so-called 2-CRT-2-lens type. This projection apparatus is provided with two projection lenses 6 instead of dichroic mirrors so that a green picture and a blue and red picture overlap with each other on the screen 7 to form a color image thereon.

Next, the structure of the phosphor screens of the green CRT 2 and blue/red CRT 8 shown in FIGS. 2 and 3 will be described. FIG. 4(a) shows the phosphor screen of the green CRT 2, and FIG. 4(b) the phosphor screen of the blue/red CRT 8. In the figures, the x-axis and y-axis indicate the long and short axes of the phosphor screens, respectively, and the arrow shows the longitudinal direction (hereinafter, referred to as "stripe direction s" of striped green, blue and red phosphors which constitute the phosphor screens. FIG. 4(c) is an enlarged view of the phosphor screen of the green CRT 2, and FIG. 4(d) an enlarged view of the phosphor screen of the blue/red CRT 8. In these figures, CS, BS, RS and BB indicate green phosphors, blue phosphors, red phosphors and black phosphors (hereinafter, respectively referred to as "green stripe", "blue stripe", "red stripe" and "black stripe"), respectively.

For example, the green, blue and red stripes CS, BS and RS are structured so as to have a width of 0.35 mm, and the black stripe BB so as to have a width of 0.1 mm. In the blue/red CRT 8 which is a two-color tube of blue and red, the black stripe BB is formed as a dead space required for two-color discrimination in order to improve the contrast. It is not necessary to provide the green CRT 2, which is a monochromatic green tube, with the black stripe BB. Although disadvantageous in terms of contrast, the green CRT 2 may be constructed so as to project a so-called "uniform" picture.

Conventional 2-CRT type projection apparatus have the following problems.

A first problem is that the structure of the phosphor screens of the green CRT 2 and blue/red CRT 8 shown in FIG. 4 cannot provide sufficiently high brightness and resolution. Namely, it has been found that the ratio of electron beam amounts required for green, blue and red phosphors of the green CRT 2 and blue/red CRT 8 is $$P\ G:\ B:\ R = 40\ (=20 \times 2):28:\ 32$$

when pictures of the green CRT 2 and blue/red CRT 8 having the phosphor screen structure shown in FIG. 4 are projected on the screen 7, for example, so as to realize the condition of 9300° K+27 MPCD which is a general criterion for a white picture.

In the above, the rate of 40 ($=20 \times 2$) of the electron beam amount required for green phosphors means that the required electron beam amount for one green stripe GS of the green CRT 2 is 40. More specifically, since two green stripes GS correspond to one blue stripe BS and one red stripe RS in the structure shown in FIG. 4(e), the rate of the electron beam amount required for the green CRT 2 is 20.

Generally, in relation to the luminosity factor of an eye, resolution is largely affected by the brightness of green. The rate of 20 of the electron beam amount required for the green CRT 2 means that it is sufficient for the electron beam to have such a reduced amount, and therefore shows a preferable tendency only in terms of resolution. However, the ratio of red to green is $32/20 = 1.6$, and namely, the electron beam for red must be 1.6 times the amount for green, thereby causing a problem that the red image becomes blurred. From this standpoint, it is preferable that the rates of the electron beam amounts respectively required for green, blue and red are equal to each other as far as possible.

In the structure of the phosphor screens of the green CRT 2 and blue/red CRT 8 shown in FIG. 4, the effective luminescence area for green can be smaller than that for blue and red, and, namely, the ineffective portion of the green CRT 2 is wider than that of the blue/red CRT 8. When improved so as to reduce such a wasted portion, the widths of the green, blue and red stripes GS, BS and RS are 0.233 mm, 0.327 mm and 0.448 mm, respectively.

A second problem is that, in the phosphor screen structure shown in FIG. 4, pictures for three colors overlap with each other and hence color reproduction is performed only inside the triangle which is in a CIE chromaticity diagram shown in FIG. 5 and defined by chromaticities of three colors G, B and R emitted from the phosphor screens, resulting in a narrow range of color reproduction.

A third problem is that the phosphor screens are formed by arranging striped phosphors in a fixed direction so that there is a direction along which a linear structure notably emerges, with the result that "Moire fringes" which are interference fringes caused by such an arrangement structure of the phosphor screens may appear in a picture projected on the screen 7. The same problem arises in a CRT wherein small circular phosphors are arranged in a matrix form and directions t along which linear structures notably emerge coincide with each other.

Measures for preventing "Moire fringes" (which is the defect in the third problem) from occurring cause the fourth problem that the manufacturing process of the green CRT 2 is different in some steps from that of the blue/red CRT 8 and hence it is not possible to commonly use manufacturing facilities for both kinds of CRTs.

SUMMARY OF THE INVENTION

It is an object of the invention to provide a 2-CRT type projection apparatus which can project a picture of improved resolution and brightness.

It is another object of the invention to provide a 2-CRT type projection apparatus which has an enlarged color reproduction range.

It is a further object of the invention to provide a 2-CRT type projection apparatus which can suppress "Moire fringes" generated in a projected picture.

According to the 2-CRT-1-lens type or 2-CRT-2-lens type projection apparatus of the invention, one of the CRTs is a green and blue two-color CRT and the other CRT is a green and red two-color CRT. In one of the CRTs, the green phosphor emits green light of higher brightness, and, in the other CRT, the green phosphor emits green light extending a color reproduction range. The directions, along which the linear structures in the phosphor arrangements each constituting the phosphor screens of the two CRTs notably emerge, cross with each other at right angles.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings illustrating the embodiments.

Figure 7:
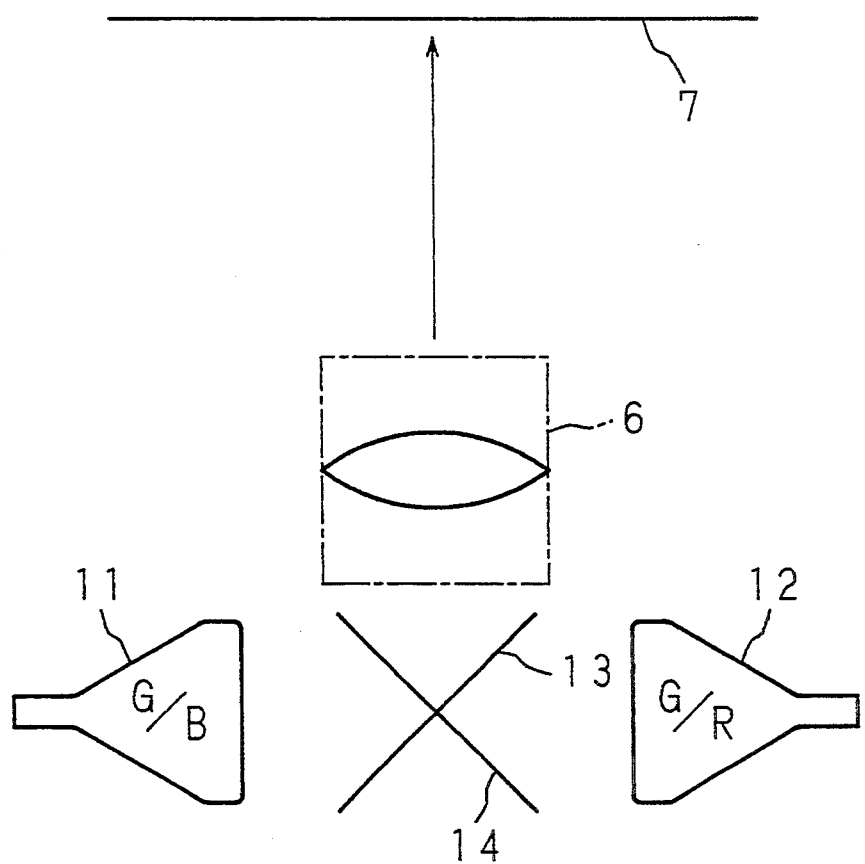
FIG. 7 is a diagram showing the configuration of a 2-CRT-1-lens type projection apparatus according to the invention.

FIG. 7 is a diagram showing the configuration of a 2-CRT-1-lens type projection apparatus according to the invention. FIGS. 7, 11 and 12 illustrate a green/blue (G/B) CRT and green/red (G/R) CRT which are separated by 180° so that their phosphor screens face each other. The phosphor screen of the green/blue CRT 11 includes of striped phosphors of two colors, green and blue, and that of the green/red CRT 12 includes of striped phosphors of two colors, green and red. Between the green/blue CRT 11 and green/red CRT 12 which face to each other, disposed are a dichroic mirror 13 which reflects only green light and blue light and a dichroic mirror 14 which reflects only green light and red light, in such a manner that the dichroic mirrors 13 and 14 cross with each other at right angles. A projection lens 6 for magnifying a picture and a screen 7 for displaying the magnified picture are arranged in this sequence along the reflection direction of the dichroic mirrors 13 and 14. In the projection apparatus, a green and blue picture projected from the green and blue CRT 11 and a green and red picture projected from the green and red CRT 12 are overlapped with each other by the dichroic mirrors 13 and 14, and these images are magnified by the projection lens 6 so as to form a color image on the screen 7.

Figure 8A:
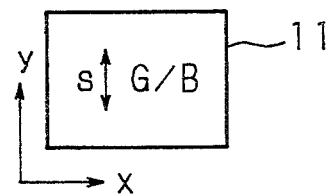
FIG. 8(a)-8(d) are diagram showing the configuration of phosphor screens of a first embodiment of the invention.
Figure 8B:
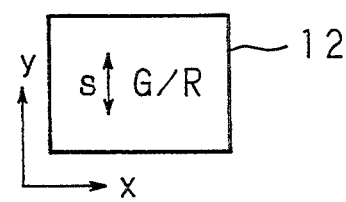
Figure 8C:
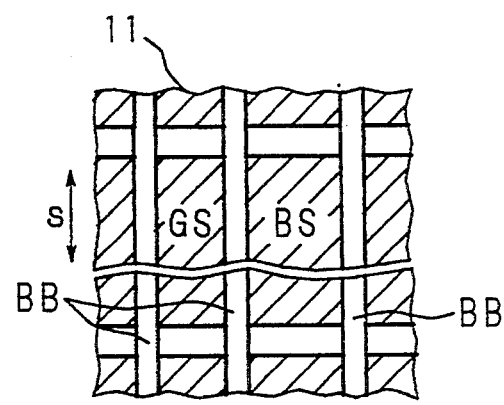
Figure 8D:
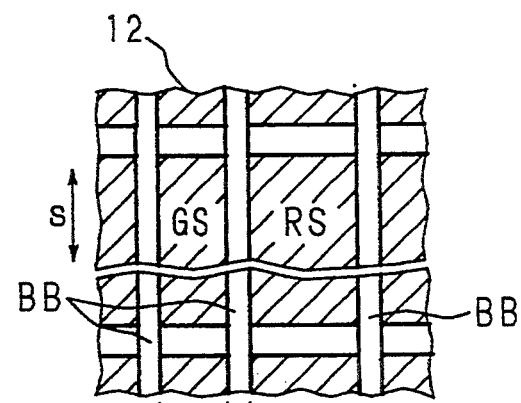

FIGS. 8(a) and 8(b) illustrate the phosphor screens of the green/blue CRT 11 and green/red CRT 12 shown in FIG. 7. In FIGS. 8(a) and 8(b), the x-axis and y-axis indicate the long and short axes of the phosphor screens, respectively, and the arrow shows the stripe direction. FIGS. 8(c) and 8(d) are enlarged views each illustrating the phosphor screens of the green/blue CRT 11 and green/red CRT 12 in one embodiment. In the embodiment shown in FIGS. 8(c) and 8(d) (hereinafter, referred to as "first example"), the green/blue CRT 11 and green/red CRT 12 employ green phosphors of the same kind (green stripe GS).

Figure 9A:
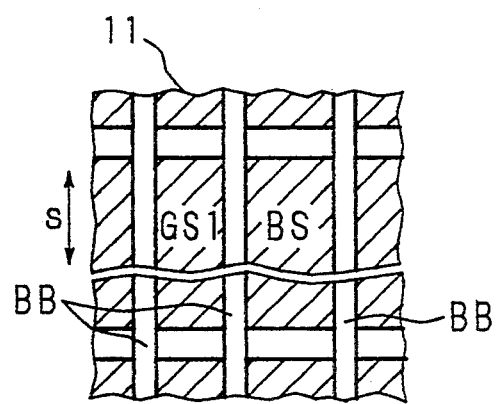
FIG. 9(a)-9(b) are diagrams showing the configuration of phosphor screens of a second embodiment of the invention.
Figure 9B:
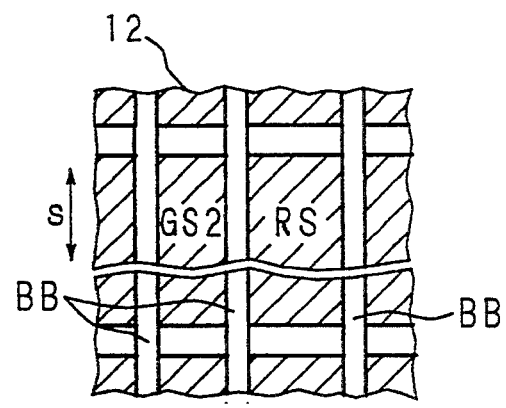

FIGS. 9(a) and 9(b) are enlarged views each illustrating the phosphor screens of the green/blue CRT 11 and green/red CRT 12 in another embodiment. In this embodiment (hereinafter, referred to as "second example"), the green/blue CRT 11 and green/red CRT 12 employ green phosphors of different kinds (green stripes GS1 and GS2). The green phosphors (green stripe GS1) of the green/blue CRT 11 include of [Y$_3$ Al$_5$O$_{12}$:Tb] to give priority to brightness, and the green phosphors (green stripe GS2) of the green/red CRT 12 include of [ZnSiO$_4$:Mn] to give priority to the enlarged color reproduction range.

Widths of stripes which are set in such configurations as first and second examples so as to obtain white light of 9300° K+27 MPCD while the electron beam amounts respectively required for green, blue and red phosphors are fixed, are listed in Table 1 below. In Table 1, widths of stripes in the prior art example and ratios of brightness of green light to that in the prior art example are also shown.

TABLE 1

| Prior Art Example | | | First Example | Second Example |
|---|---|---|---|---|
| CRT2 | GS = 0.233 | CRT11 | GS = 0.269 | GS1 = 0.308 |
| | GS = 0.233 | | BS = 0.378 | BS = 0.392 |
| | BB = 0.100 | | BB = 0.100 | BB = 0.100 |
| CRT8 | BS = 0.327 | CRT12 | GS = 0.269 | GS2 = 0.252 |
| | RS = 0.448 | | RS = 0.431 | RS = 0.448 |
| | BB = 0.100 | | BB = 0.100 | BB = 0.100 |
| Ratio of Brightness of Green Light to That of Prior Art Example | | | $\frac{0.538}{0.466} \approx 1.15$ | $\frac{0.560}{0.466} \approx 1.20$ |

GS: Green Stripe
GS1: Green Stripe (Priority to Brightness)
GS2: Green Stripe (Priority to Color Reproduction)
BS: Blue Stripe
RS: Red Stripe
BB: Black Stripe
(Unit: mm)

In the first example, the brightness of green light is improved by 1.15 times as compared with the prior art example, and, in the second example, the brightness of green light is improved by 1.20 times as compared with the prior art example. In this way, according to the invention, the two CRTs are constructed using phosphor screens which respectively emit two-color light of green and blue; and green and red, and therefore it is possible to improve the resolution and also to obtain a projected picture brighter than that obtained in the prior art example, with the same electron beam amount.

Figure 10:
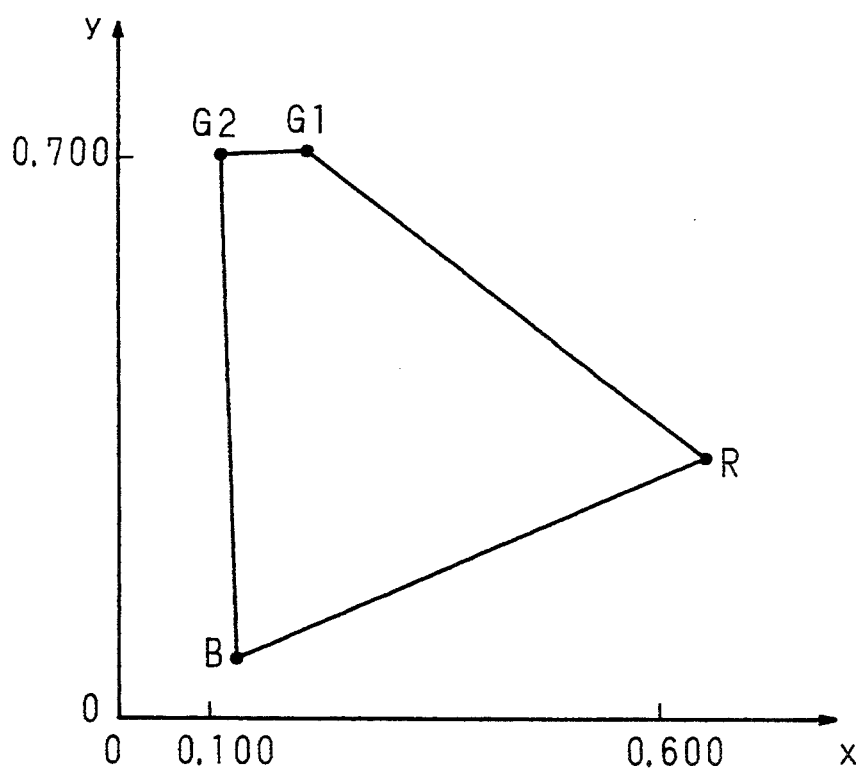
FIG. 10 is a CIE chromaticity diagram of the second embodiment.

According to the second example, as shown in the CIE chromaticity diagram of FIG. 10, the color reproduction range is extended to the range defined by G1, G2, B and R. In this way, since the green phosphors of one of the two CRTs are formed by those emitting green light of higher brightness and the green phosphors of the other CRT are formed by those emitting green light which can extend the color reproduction range, it is possible to obtain a further brighter projected picture and also to extend the color reproduction range.

Figure 11A:
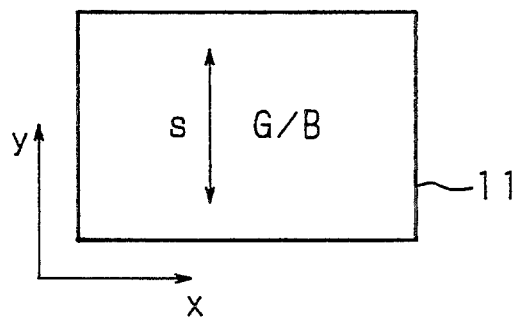
FIG. 11(a) and 11(b) are diagrams showing the configuration of phosphor screens of a third embodiment of the invention.
Figure 11B:
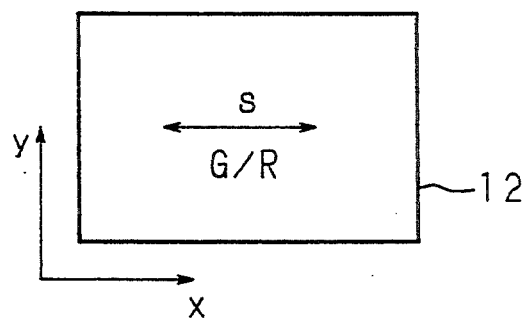

FIGS. 11(a) and 11(b) show phosphor screens of the green/blue CRT 11 and green/red CRT 12 in another embodiment of the invention, respectively. In this embodiment, the stripe directions of the CRT 11 is different from that of the CRT 12. More specifically, the stripe direction s of the CRT 11 corresponds to the y-axis, and the stripe directions of the CRT 12 along to the x-axis. The aspect ratio of the CRTs 11 and 12 is 4:3. In this way, directions along which the linear structures of the phosphor arrangements each constituting the phosphor screens of the two CRTs notably emerge are perpendicular to each other, thereby suppressing the generation of "Moire fringes" which may appear on a projected picture due to the structure of a phosphor screen of a CRT.

Figure 12A:
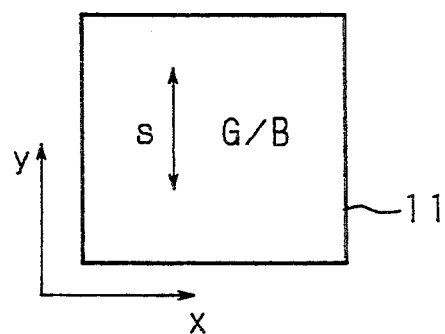
FIG. 12(a) and 12(b) are diagrams showing the configuration of phosphor screens of a fourth embodiment of the invention.
Figure 12B:
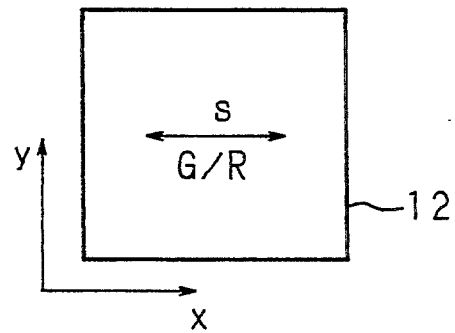

FIGS. 12(a) and 12(b) show phosphor screens of the green/blue CRT 11 and green/red CRT 12 in further embodiment of the invention, respectively. In this embodiment, the stripe direction s of the CRT 11 is perpendicular to that of the CRT 12 in the same manner as the embodiment shown in FIG. 11, and the phosphor screens of the CRTs 11 and 12 have a square shape or a shape similar to a square. According to this configuration, the same manufacturing facilities are allowed to be employed in both the manufactures of the CRTs 11 and 12, simply by changing the kind of the phosphor to be used.

Figure 1:
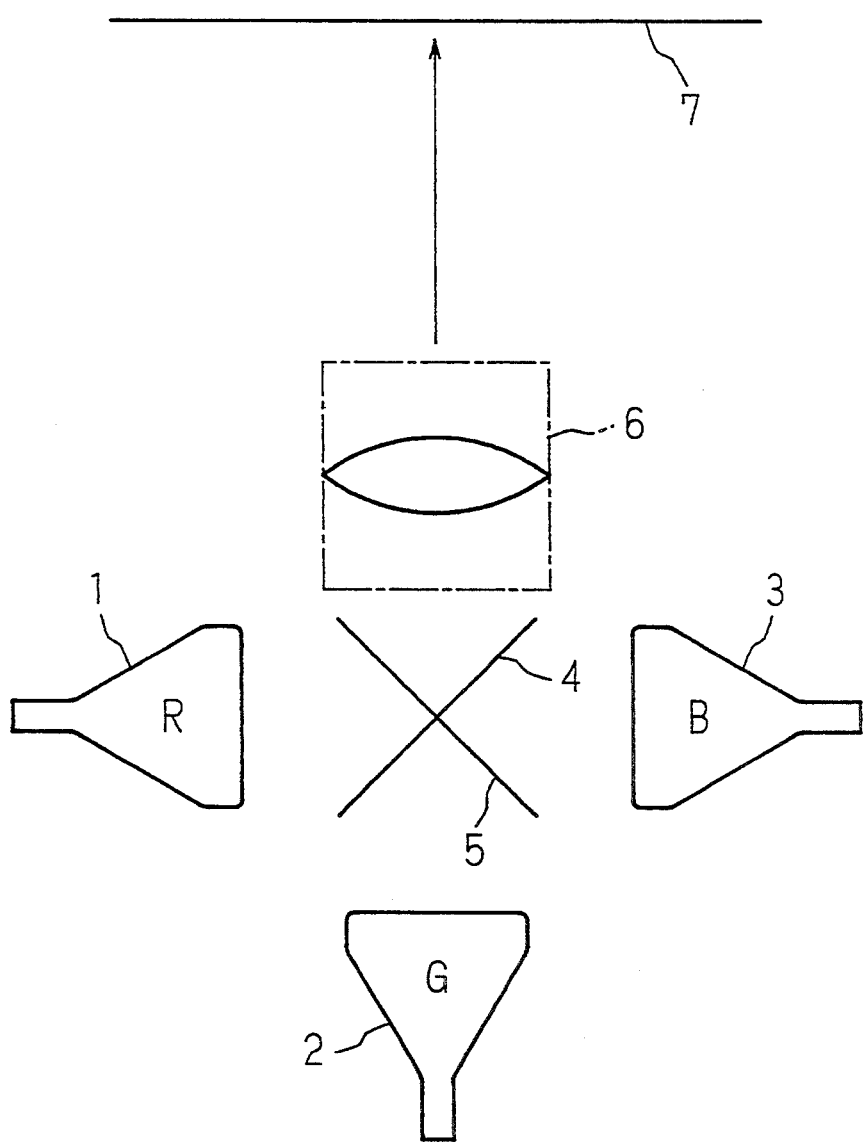
FIG. 1 is a diagram showing the configuration of a conventional 3-CRT-1-lens type projection apparatus.
Figure 2:
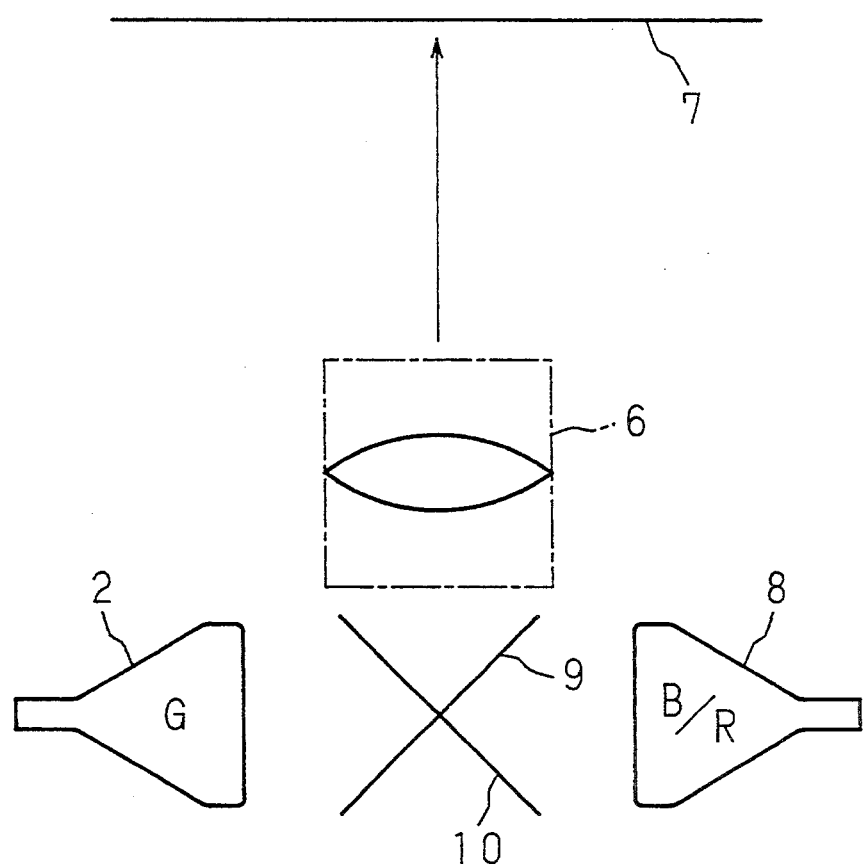
FIG. 2 is a diagram showing the configuration of a conventional 2-CRT-1-lens type projection apparatus.
Figure 3:
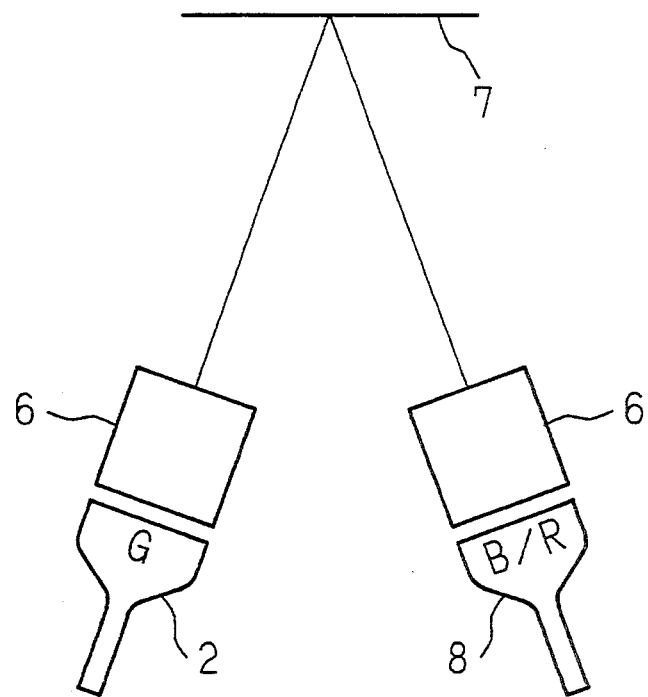
FIG. 3 is a diagram showing the configuration of a conventional 2-CRT-2-lens type projection apparatus.
Figure 4A:
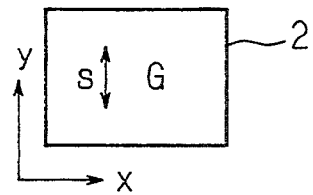
FIG. 4(a)-4(d) are diagrams showing the configuration of phosphor screens of the conventional projection apparatus shown in FIGS. 2 and 3.
Figure 4B:
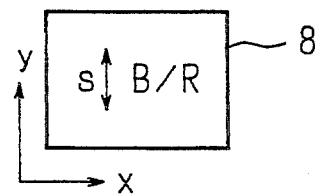
Figure 4C:
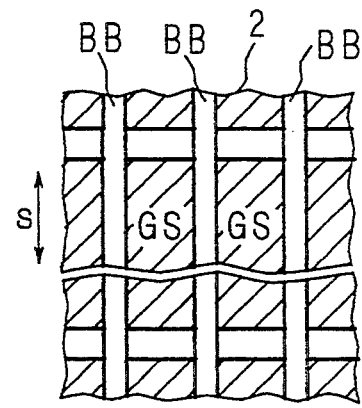
Figure 4D:
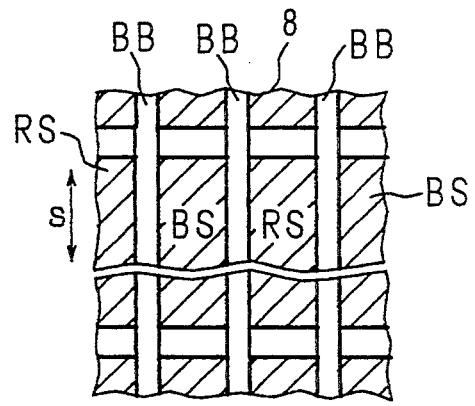
Figure 5:
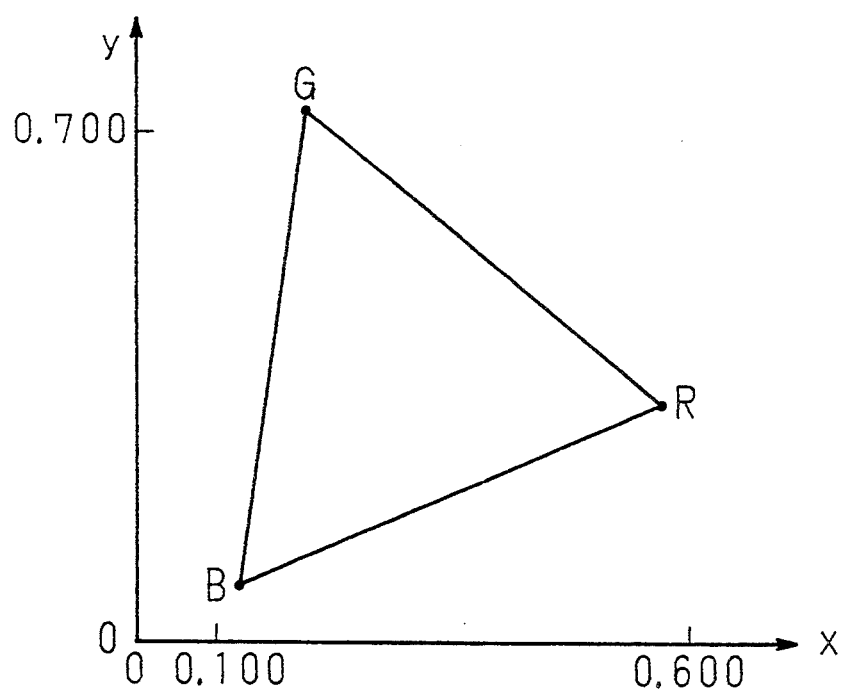
FIG. 5 is a CIE chromaticity diagram of a conventional projection apparatus.
Figure 6:
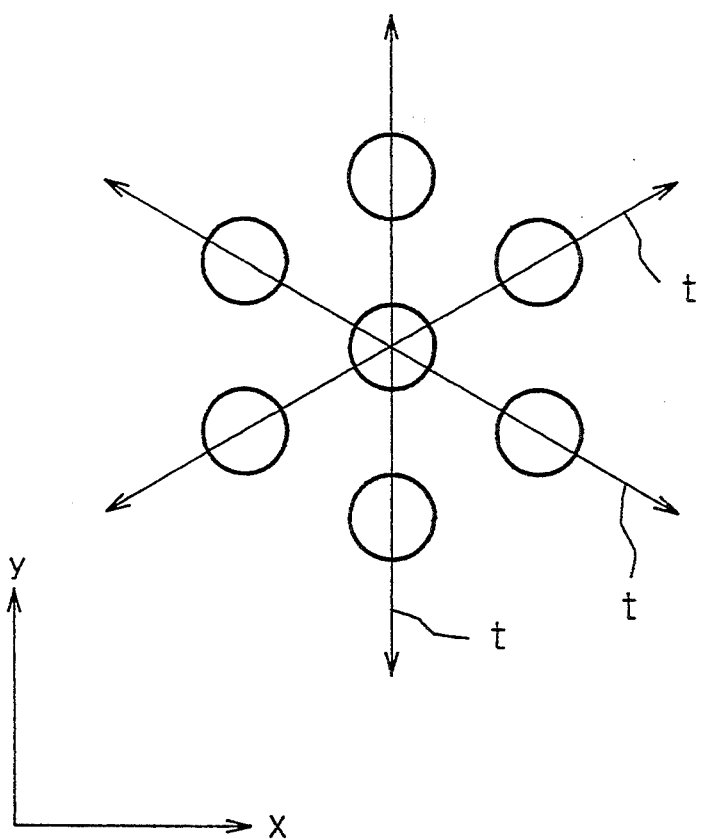
FIG. 6 is a diagram showing directions along which the linear structure of a phosphor arrangement of a dot matrix CRT notably emerges.

Although the embodiments in which the CRTs 11 and 12 have a stripe structure of a shadow-mask type CRT have been described, dot-matrix type CRTs may be used in the invention. When dot-matrix type CRTs are used, directions t along which the linear structure of a phosphor arrangement notably emerges (refer to FIG. 6) are dealt with in the same manner as the stripe directions s.

Although the embodiments in which both the CRTs 11 and 12 are of the shadow-mask type have been described, both the CRTs may be of the beam-index type, or alternatively one of the CRTs (the green/blue CRT 11) may be a beam-index type CRT which is excellent in utilization efficiency of electron beams and the other CRT (green/red CRT 12) may be a shadow-mask type CRT. This combined use of CRTs of two types allows the advantages of the two types to be effectively utilized so as to obtain a higher resolution and a brighter projected picture.

Although the embodiments of 2-CRT-1-lens type projection apparatus have been described, it is needless to say that the invention can be applied also to a 2-CRT-2-lens type projection apparatus in the same manner. Furthermore, the invention can be also applied in the completely same manner to a 6-CRT-6-lens projection apparatus which projects the same picture in an overlapped manner onto a large screen of 120 to 200 inches, or to the construction of a 4-CRT-2-lens type or 4-CRT-4-lens type.

Figure 13A:
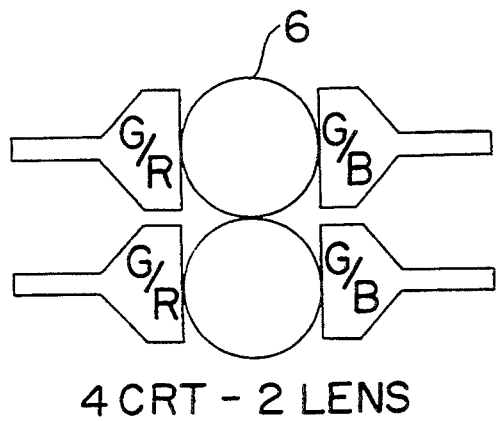
FIGS. 13(a), 13(b), and 13(c) illustrate 4-CRT-2-lens, 4-CRT-4-lens, and 4-CRT-6-lens projection apparatus, respectively.
Figure 13B:
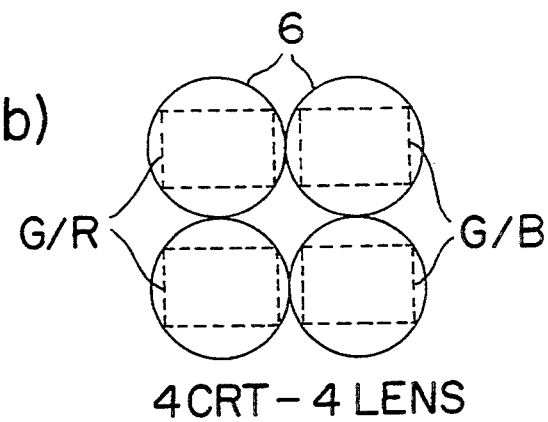
Figure 13C:
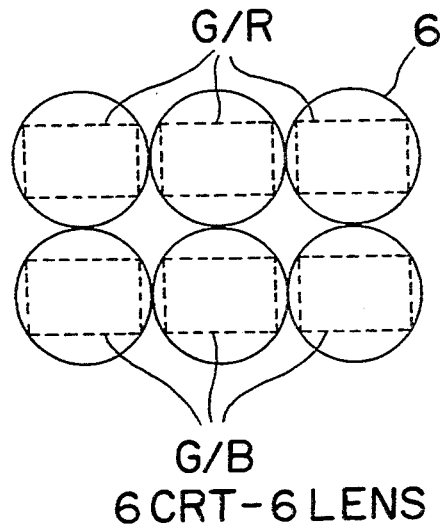

FIGS. 13(a), 13(b), and 13(c) illustrate 4-CRT-2-lens, 4-CRT-4-lens, and 4-CRT-6-lens projection apparatus, respectively.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A 2-CRT type projection apparatus, comprising:
    a first cathode ray tube having a phosphor screen which is formed by green and blue phosphors;
    a second cathode ray tube having a phosphor screen which is formed by green and red phosphors, wherein the green phosphor of said first cathode ray tube emits green light having higher brightness than the green phosphor of said second cathode ray tube and wherein the green phosphor of said second cathode ray tube is a phosphor which emits green light extending a color reproduction range of the red phosphor, the blue phosphor, and the green phosphor of said first cathode ray tube.

2. The 2-CRT type projection apparatus of claim 1, wherein a stripe direction of said first cathode ray tube is substantially perpendicular to a stripe direction of said second cathode ray tube.

3. The 2-CRT type projection apparatus of claim 2, wherein the phosphor screens of said first and second cathode ray tubes have a square shape.

4. The 2-CRT type projection apparatus of claim 1, wherein the phosphor screens of said first and second cathode ray tubes are formed by striped phosphors.

5. The 2-CRT type projection apparatus of claim 4, wherein a longitudinal direction of the phosphors of said first cathode ray tube is substantially perpendicular to a longitudinal direction of the phosphors of said second cathode ray tube.

6. The 2-CRT type projection apparatus of claim 1, wherein said first cathode ray tube is a beam-index type cathode ray tube and said second cathode ray tube is a shadow-mask type cathode ray tube.

7. The 2-CRT type projection apparatus of claim 1, wherein said apparatus is a 2-CRT-1-lens type projection apparatus.

8. The 2-CRT type projection apparatus of claim 1, wherein said apparatus is a 2-CRT-2-lens type projection apparatus.

9. A 2-CRT type projection apparatus comprising:
    a first cathode ray tube having a phosphor screen which is formed by green and blue phosphors;
    a second cathode ray tube having a phosphor screen which is formed by green and red phosphors;
    a first dichroic mirror which reflects green light and blue light;
    a second dichroic mirror which reflects green light and red light; and
    a projection lens which expands light reflected from said first and second dichroic mirrors;
    wherein the green phosphor of said first cathode ray tube is different in kind from the green phosphor of said second cathode ray tube.

10. The 2-CRT type projection apparatus of claim 9, wherein the green phosphor of said first cathode ray tube is made of $Y_3Al_5O_{12}:Tb$ and the green phosphor of said second cathode ray tube is made of $ZnSiO_4:Mn$.

11. A two-CRT type projection apparatus comprising:
    red/green CRT means for generating red and green light; and
    blue/green CRT means for generating blue and green light wherein a green phosphor of said red/green CRT means emits green light having higher brightness than a green phosphor of said blue/green CRT means and wherein the green light generated by said blue/green CRT means extends a color reproduction range of the red phosphor, the blue phosphor, and .the green phosphor of said red/green CRT means.

12. The two-CRT type projection apparatus of claim 11, further comprising
    first and second dichroic mirrors, arranged at a right angle to each other, for reflecting the red and green light from said red/green CRT means and the blue and green light from said blue/green CRT means, respectively.

13. The two-CRT type projection apparatus of claim 12, further comprising a projection lens for magnifying and projecting the light reflected by said first and second dichroic mirrors on a screen.

14. The two-CRT type projection apparatus of claim 11, wherein a phosphor screen of said red/green CRT means includes green, black, and red stripes and a phosphor screen of said blue/green CRT means includes green, black, and blue stripes.

15. The two-CRT type projection apparatus of claim 14, wherein the black stripes are 0.1 mm wide, the red stripes are 0.431 mm wide, the blue stripes are 0.378 mm wide, and the green stripes are 0.269 mm wide.

16. The two-CRT type projection apparatus of claim 14, wherein the black stripes are 0.1 mm wide, the red stripes are 0.448 mm wide, the blue stripes are 0.392 mm wide, and the green stripes are 0.308 mm wide.

17. The two- CRT type projection apparatus of claim 16, wherein the green stripes of said red/green CRT means are made of $ZnSiO_4:Mn$ and the green stripes of said blue/green CRT means are mode of $Y_3Al_5O_{12}:Tb$.

18. The two-CRT type projection apparatus of claim 11, wherein said red/green CRT means and said blue/green CRT means have the same stripe directions.

19. The two-CRT type projection apparatus of claim 11, wherein said red/green CRT means and said blue/green CRT means have different stripe directions.

20. The two-CRT type projection apparatus of claim 19, wherein said red/green CRT means and said blue/green CRT means have substantially perpendicular stripe directions.

21. The two-CRT type projection apparatus of claim 11, wherein a phosphor screen of said red/green CRT means and said blue/green CRT means are rectangular in shape.

22. The two-CRT type projection apparatus of claim 21, wherein a phosphor screen of said red/green CRT means and said blue/green CRT means are square in shape.

23. The two-CRT type projection apparatus of claim 21, wherein said red/green CRT means and said blue/green CRT means have perpendicular stripe directions.

24. The two-CRT type projection apparatus of claim 22, wherein said red/green CRT means and said blue/green CRT means have perpendicular stripe directions.

25. The two-CRT type projection apparatus of claim 11, wherein said red/green CRT means and said blue/green CRT means are shadow-mask type CRTs.

26. The two-CRT type projection apparatus of claim 11, wherein said red/green CRT means and said blue/green CRT means are dot-matrix type CRTs.

27. The two-CRT type projection apparatus of claim 11, wherein said red/green CRT means and said blue/green CRT means are beam index type CRTs.

28. The two-CRT type apparatus of claim 11, wherein said red/green CRT means is a shadow-mask type CRT and said blue/green CRT means is a beam index type CRT.

29. A 2-CRT-1-lens type projection system, including the two-CRT type projection apparatus of claim 11.

30. A 2-CRT-2-lens type projection system, including the two-CRT type projection apparatus of claim 11.

31. A 4-CRT-2-lens type projection system, including the two-CRT type projection apparatus of claim 11.

32. A 4-CRT-4-lens type projection system, including the two-CRT type projection apparatus of claim 11.

33. A 6-CRT-6-lens type projection system, including the two-CRT type projection apparatus of claim 11.

* * * * *